United States Patent Office 2,807,583
Patented Sept. 24, 1957

2,807,583
LUBRICANT FOR BOWDEN WIRE MECHANISMS

Otto J. Bratz and Vincent C. J. Peterson, Adrian, Mich., assignors to American Chain & Cable Company, Inc., Bridgeport, Conn., a corporation of New York No Drawing. Application December 18, 1951, Serial No. 262,341

5 Claims. (Cl. 252—18)

This invention relates to lubrication, and is particularly directed to the lubrication of Bowden wire assemblies.

Bowden wires, comprising a flexible, usually metallic conduit, and a flexible wire or strand therein, adapted for sliding relative to the conduit, are widely used for the transmission of motion, especially for controls and the like on vehicles and airplanes.

The motion being reciprocatory, in many cases slight and infrequent, the control requires a lubricant which remains effective for long periods despite no, or very slight, motion of the internal member relative to the conduit. As the interior of the conduit, and the exterior of the internal member (if of strand) are of necessity irregular, engagement between them is only on small areas, and the unit pressure is accordingly high. The pressure is quite high when the mechanism is bent on a short radius. In addition to this, it is necessary that the lubricant stay in place and not have a tendency to ooze out through the interstices of the conduit. If the mechanism is installed in an airplane, the lubricant must be effective over a wide temperature range.

With the above requirements in mind, it is an object of the present invention to provide a lubricant for a Bowden wire assembly which is effective over a wide range of temperatures, remains in place, and is effective under high unit pressures and despite only occasional movement of the interior member relative to the conduit.

As the controls attached to Bowden wires are manually operated, either on direct pull or through linkages, and in many cases are required to be capable of adjustment to exact position, it is essential that they operate smoothly. With the previous lubricants proposed, the tendency has been for the controls to stick, until sufficient force is applied to overcome the static friction between the parts. At this point, the friction drops to a lower value, resulting in a jerky motion of the control which makes it difficult to set the control exactly as desired.

It is therefore a further object of the present invention to provide a lubricant for Bowden wire assemblies which will reduce the static friction sufficiently to eliminate the tendency of the control to have a jerky motion.

In carrying out this invention, it is proposed to utilize the lubricating properties of phosphates to reduce the static and running friction between the parts of the assembly. Selection of a compound of this nature is beset by certain limitations because of the service which is expected of the control. The lubricant is made of refined mineral oil, a soap and the phosphate. It is necessary that the phosphate have certain properties in order to enable it to lubricate well in the form of a solid in powder form. It must, of course, be finely divided, to pass through a 300-mesh sieve, and is required to be of a material which will not react with either the other ingredients of the lubricant or the metal of which the Bowden mechanism is made. Insolubility in water, is desirable as it eliminates any effect of the atmosphere on the lubricant. It is preferable to have the lubricant non-abrasive with respect to the metal of the mechanism, or the metal with which it may be coated or plated.

All of these properties are possessed to a satisfactory degree by both aluminum phosphate and ferric phosphate.

A suitable composition employing aluminum phosphate as the solid additive is as follows:

| | Percent |
|---|---|
| Aluminum phosphate, 300 mesh | 5 |
| Lithium soap grease | 95 |

It has been found that the amount of aluminum phosphate is not overly critical. Amounts as low as 1%, and as high as 15% have been successfully utilized. In the lower ranges, however, the tendency to jerkiness begins to appear again although operation is better than without the phosphate.

The lithium soap grease is utilized because it has suitable stability and also because it is capable of holding the phosphate in correct suspension. The grade and amount of soap and oil forming the grease preferably give it the following properties:

| | |
|---|---|
| Penetration | 380–400 (unworked). |
| Melting point | 350° F. |
| Channel point | Minus 40° F. |
| Viscosity of oil | 60–80 at 100° F. |

Such a grease can readily be made by methods well known in the art. The amount of soap is approximately ten percent of the amount of oil, the exact amount being determined by the desired physical characteristics of the finished product.

Another satisfactory compounding which is particularly effective in long life tests is as follows:

| | Percent |
|---|---|
| Lithium soap grease | 90 |
| Aluminum phosphate | 5 |
| Ferric phosphate | 3 |
| Cadmium sulfide | 2 |

In this formulation, the grease base has the same physical properties as in the previous example, and the three added solids are powdered to 300 mesh or finer. The cadmium sulfide is preferably amorphous, such as is produced by precipitation.

No theory can be advanced as to why the particular compounds utilized work well, while others do not. It has become apparent, however, that the utility of a compound added to the grease for decreasing static friction cannot be inferred from the use of a compound in a situation where the lubricant works well under heavy running friction, such as for example, hypoid gearing.

We claim:

1. A lubricant for Bowden wire controls comprising a major amount of petroleum oil and lithium soap forming a grease and finely divided aluminum phosphate, said aluminum phosphate comprising from 1% to 15% of the lubricant by weight.

2. A lubricant for Bowden wire controls comprising a major amount of petroleum oil and lithium soap forming a grease and finely divided aluminum phosphate, said aluminum phosphate comprising 5% of the lubricant by weight.

3. A lubricant for Bowden wire controls comprising a major amount of petroleum oil and lithium soap forming a grease, and finely divided aluminum phosphate and ferric phosphate, the aluminum phosphate and ferric phosphate forming 8% of the lubricant by weight.

4. A lubricant for Bowden wire controls comprising a major amount of petroleum oil and lithium soap forming a grease, and finely divided aluminum phosphate to the amount of 5% of the lubricant, and finely divided ferric phosphate to the amount of 3% of the lubricant, both by weight.

5. A lubricant for Bowden wire controls comprising a major amount of petroleum oil and lithium soap forming a grease, and finely divided aluminum phosphate to the amount of 5%, finely divided ferric phosphate to the amount of 3%, and finely divided cadmium sulphide to the amount of 2% of the lubricant, all by weight.

References Cited in the file of this patent

UNITED STATES PATENTS

| | | |
|---|---|---|
| 2,258,309 | Zimmer | Oct. 7, 1941 |
| 2,421,543 | Cook | June 3, 1947 |
| 2,477,296 | Georgi | July 26, 1949 |
| 2,588,234 | Hendricks | Mar. 4, 1952 |